April 26, 1960 H. F. PUMPHREY 2,933,762
BARREL TYPE EXTRUDERS

Filed Feb. 20, 1957 3 Sheets-Sheet 3

INVENTOR
Howard Francis Pumphrey
by Benj T. Rauber
Attorney

United States Patent Office 2,933,762
Patented Apr. 26, 1960

2,933,762

BARREL TYPE EXTRUDERS

Howard Francis Pumphrey, Solihull, England, assignor to Dunlop Rubber Company Limited, London, England, a British company Application February 20, 1957, Serial No. 641,317

Claims priority, application Great Britain March 3, 1956

3 Claims. (Cl. 18—13)

This invention relates to barrel-type extruders i.e. extruders comprising a barrel and a co-axial rotatable extruding screw located therein.

It is an object of the present invention to provide an extruder for continuously supplying extruded material to a reception point, rotating orbitally, such as, for example, the carriage in the winding apparatus for the manufacture of pneumatic tires disclosed in my co-pending patent application Serial No. 632,924, filed January 7, 1957, now Patent No. 2,855,158, or to a reception point rotating about its own axis.

Unlike conventional barrel-type extruding apparatus, in the apparatus according to the invention the barrel is rotatable in addition to the extruder screw. Advantageously, this prevents or limits twisting of the extruded material between the extruder and an orbitally rotating reception point.

According to the invention a barrel-type extruder comprises a barrel having a feed aperture formed therein, an extruder die at one end of the barrel, means for rotating the barrel about its longitudinal axis, an extruder screw mounted co-axially within the barrel and means for rotating the screw at a predetermined speed relative to the speed of rotation of the barrel.

The extruder may have means attached to the barrel for carrying a length of plastic extrudable material. The said means may comprise a supporting plate having a spindle mounted thereon, and the axis of the spindle being disposed in parallel relationship to the longitudinal axis of the barrel and the spindle being adapted to support a spool carrying the said length of material.

The apparatus may also comprise a spindle or spindles attached to the supporting plate for carrying a length or lengths of filamentary material to be rubberized by the extrusion of rubber through the die, means being provided for guiding the filamentary material from the spindles, along the barrel to the die.

One embodiment of the invention will now be described by way of example with reference to the accompanying drawings in which.

Figure 1:
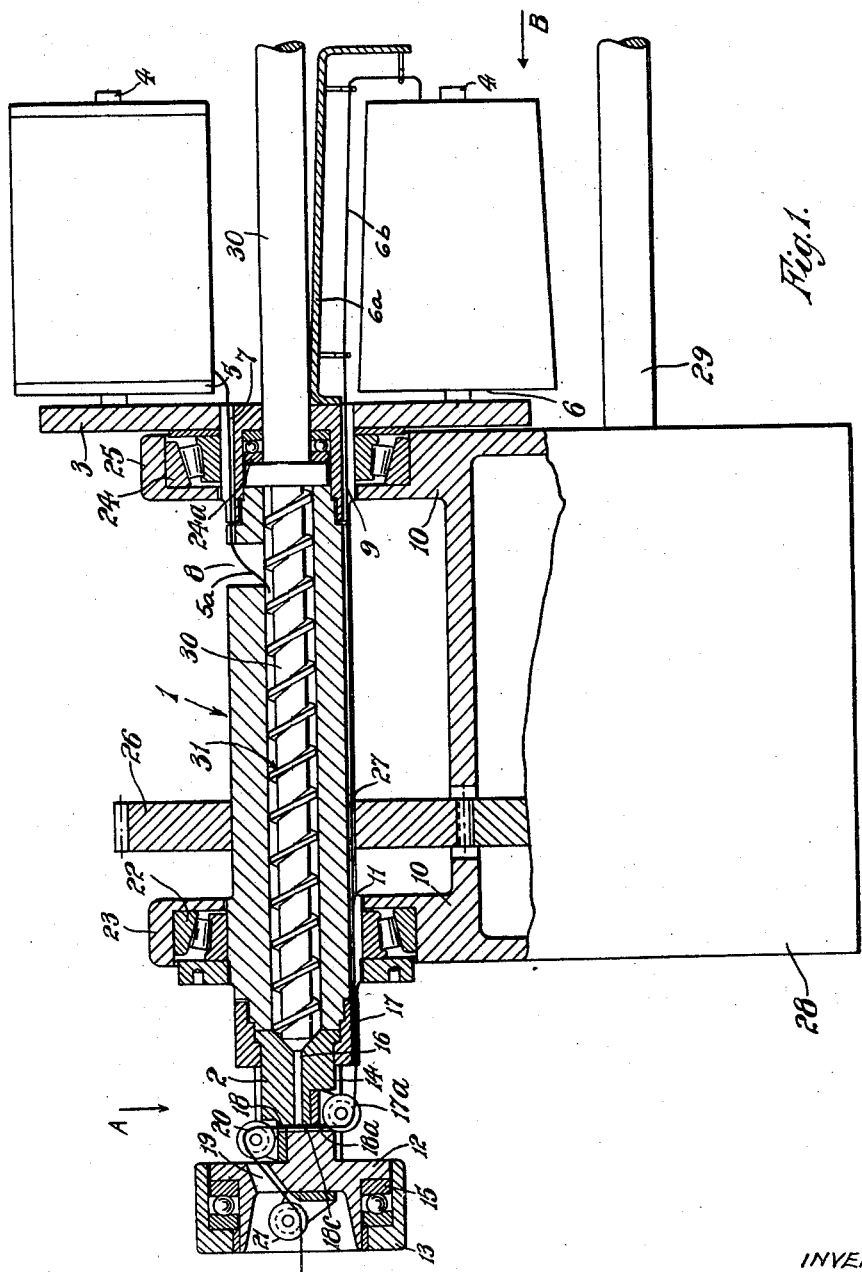
Figure 1 is a side elevational view partly in cross-section of an extruder.

Apparatus for simultaneously rubberizing three lengths of rayon tire cord comprises an extruder barrel 1 having an extruder die 2 attached to one end thereof, and a supporting plate 3 attached to its other end, this plate carrying four spindles 4, disposed on a common pitch circle with their longitudinal axes parallel with the longitudinal axis of the barrel 1. One of the spindles is provided for carrying a spool 5 wound with a continuous strip of unvulcanized rubber stock, the remaining three spindles being provided for carrying three spools 6 each wound with a continuous length of tire cord. Guides 6a are associated one with each spool 6. An aperture 7 is provided in the plate 3 and the frame 10 through which the rubber strip may pass and an adjacent feed aperture 8 is provided in the barrel through which the rubber strip may pass to the barrel interior. A second aperture 9 is provided in the plate 3 and the frame 10 through which cords from the spools may pass, the cords being disposed axially along the length of the barrel through a further aperture 11 between the frame 10 and the barrel 1 to the die 2 and die head 12 which will now be more particularly described.

The die 2 has a co-axial extruding orifice 16 and is drivably yet detachably attached to the barrel 1 by means of the collar 17. A transverse groove 18 is formed in the end face of the die 2 from one side to the other and joins the orifice 16. A freely rotatable guide pulley 17a is provided for guiding tire cords from the spools 6 into the groove 18 from the aperture 11.

Figure 2:
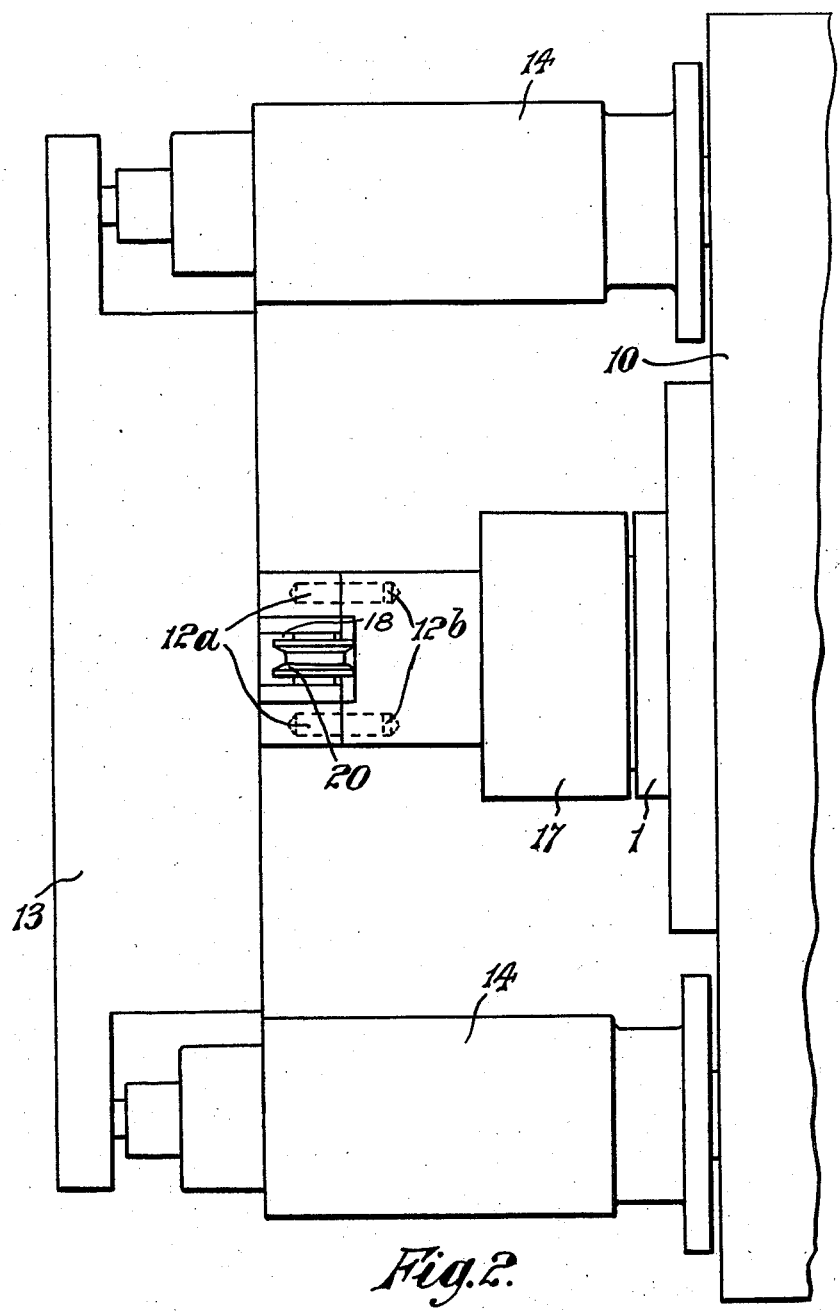
Figure 2 is a part plan view taken in the direction of arrow "A" of Figure 1.
Figure 3:
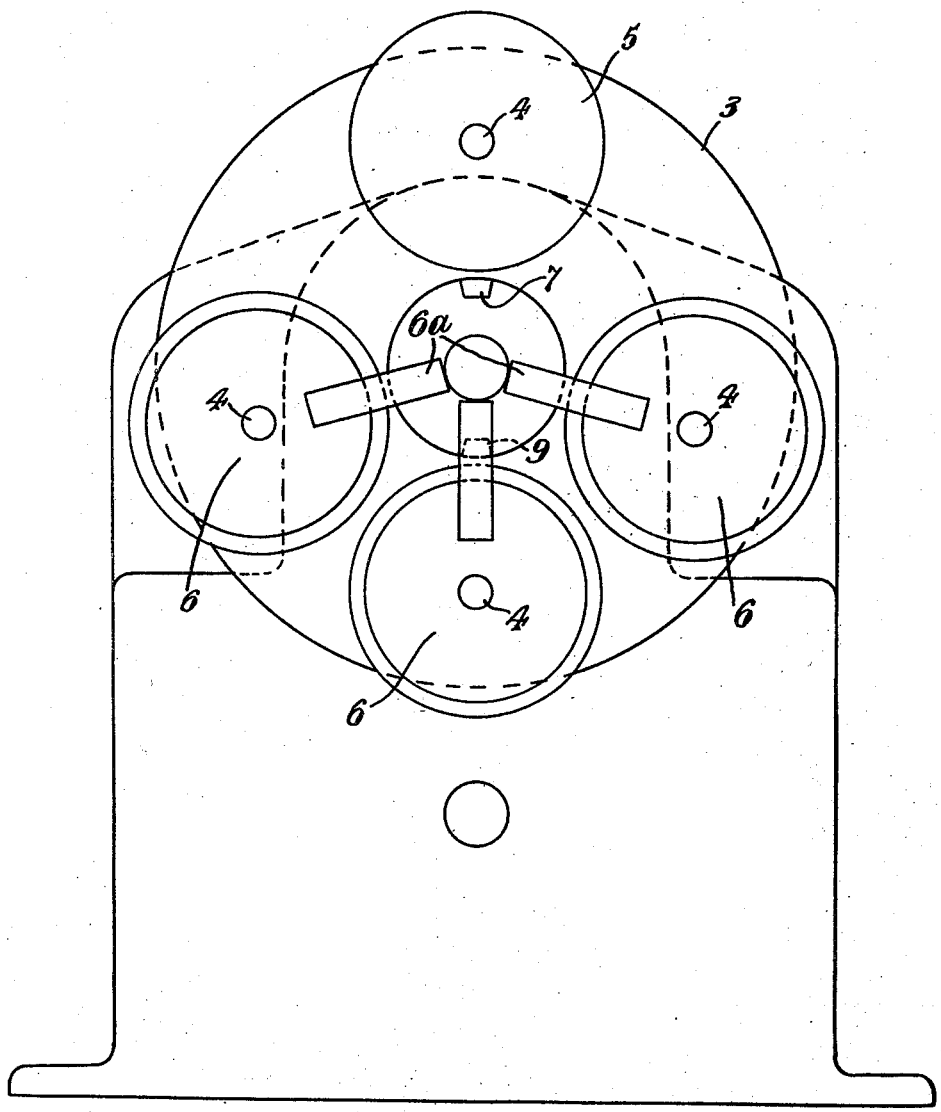
Figure 3 is an end view taken in the direction of arrow "B" of Figure 1.

The die head 12 is supported centrally in a thrust bearing 15 carried in a transverse member 13 mounted at each end on hydraulic pistons and cylinders 14 (see particularly Figure 2). These are attached to the frame 10.

The die head is drivably connected to the die by means of a pair of axially extending driving pins 12a attached to the die head and slidably engageable with corresponding holes 12b formed in the die (see Figure 2). A transverse groove 18a is formed in the end face of the die head which corresponds with the groove 18 formed in the die 2, these two grooves co-operating to form a transverse passage 18c. An opening 19 is provided in the die head and freely rotatable guide pulleys 20 and 21 are mounted one on each side of it for guiding the rubberized tire cords which pass through the transverse passage 18c.

The barrel 1 is rotatably supported at one end on a taper-roller thrust bearing 22 carried in a housing 23 formed integrally with the frame 10 and is similarly supported at the other end in a bearing 24 and housing 25. A gear wheel 26 is drivably attached co-axially to the barrel, an aperture 27 being formed in the gear wheel in alignment with the apertures 9 and 11. The gear wheel is connected by a gear train, located in the base 28 to a main driving shaft 29. The main shaft is directly connected to a driving means (not illustrated) and to an extruder screw shaft 30 mounted co-axially with the barrel on the thrust bearing 24a, the latter shaft being driven in the opposite direction to the direction of rotation of the barrel and at a predetermined speed relative thereto so as to obtain the desired rate of extrusion consistent with the rate at which the cords are fed through the transverse passage 18 in the die and die head. The extruder screw shaft has an extruding screw-thread 31 formed thereon, the screw-thread being of conventional design and being disposed within the barrel, rotation of the screw and barrel being adapted to cause the passage of rubber along the barrel from the feed aperture 8 to the die 2 and die head 12.

The operation of the apparatus just outlined will now be described in conjunction with the pneumatic tire cover winding apparatus described in my co-pending patent application Serial No. 632,924, filed January 7, 1957.

In the apparatus described in the above-mentioned co-pending application a former is provided upon which a tire cover is wound, and a housing is provided having a circular track surrounding the former. A carriage is located in the track and is constrained to run therein, a guide for the cord to be wound on the former being mounted on the carriage. Rotation of the former and simultaneous rotation of the carriage around the track results in the winding of a tire cover, the supply of cord for the winding being mounted on a support carried on a pair of arms rigidly attached one to each side of the housing.

The apparatus forming the subject-matter of the present invention is mounted on the above-mentioned support, the axis of rotation of the extruder shaft 30 being disposed co-axially with the axis of the said circular track formed in the housing. The main shaft is directly connected to the shaft provided for rotating the carriage in the circular track so that the rate of operation of the apparatus is directly related to the rate of rotation of the carriage in the track. Moreover, the apparatus is designed so that the speed of rotation of the barrel is the same as the speed of rotation of the said carriage and also in the same direction as the carriage.

During operation of the apparatus, rubber strip 5a is drawn from the supply spool 5 by the extruder screw shaft 30 and is extruded thereby through the orifice 16 in the die 2 and into the transverse passage 18c formed in the die and die head. Three lengths 6b of cord, one from each of the supply spools 6, pass over the guides 6a disposed in side by side relationship, along the length of the barrel and through the apertures 9, 27 and 11. They then pass through the transverse passage 18c and are rubberized during their passage with rubber extruded through the orifice 16. The rubberized cords are drawn by the rotating carriage over the guide pulleys 17a, 20 and 21 attached to the die and die head to be wound by the carriage onto the former in the manner described in my co-pending patent application Serial No. 632,924, filed January 7, 1957, now Patent No. 2,855,158, earlier referred to.

It will be noted that there is no relative rotational movement between the die head and the carriage of the winding apparatus, this being essential in order to wind a cover without twisting of the rubberized group of tire cords.

Threading of the cords through the passage 18 is facilitated by moving the die head 12 clear of the die by means of the pistons and cylinders 14 provided. This also facilitates clearing of the orifice 16.

Although, in the apparatus described, the screw and barrel are rotatable in opposite directions, in an alternative construction the screw and barrel are rotatable in the same direction but at a predetermined differential speed in order to obtain the required rate of extrusion.

Having now described my invention, what I claim is:

1. A barrel-type extruder for covering filamentary material with extrudable material and delivering a rotating composite extruded element comprising a barrel rotatable on its axis and having a feed aperture formed therein, an extruder die at the delivery end of the barrel, an extruder screw rotatably mounted coaxially within the barrel, means for rotating the screw and means for rotating the barrel and the die together relative to the screw, means attached to the barrel for carrying a length of plastic extrudable material and a supply of filamentary material, means rotatable with the barrel for guiding said length of plastic material to the feed aperture, means rotatable with the barrel for guiding the said filamentary material exteriorly of the barrel to the die and across an extruding orifice formed in the die, to enable the filamentary material to be covered by plastic material extruded therethrough, and thence to a delivery point on the axis of the barrel whereby the composite extruded material, on delivery, rotates about its axis at the speed of rotation of the barrel.

2. A barrel-type extruder according to claim 1 wherein the means for carrying a length of plastic extrudable material and a supply of filamentary material comprises a supporting plate having spindles mounted thereon for carrying spools of said extrudable material and of said filamentary material.

3. A barrel-type extruder for covering filamentary material with extrudable material and delivering a rotating composite extruded element comprising a barrel having a feed aperture formed therein, an extruder die secured to the barrel at one end thereof, and having an extruding orifice, an extruder screw rotatably mounted coaxially within the barrel, driving means for rotating the barrel and the screw at a relative speed to each other, a die head connected to the die for rotation therewith and movable towards and away therefrom, storage means rotatable with the barrel for a bulk supply of extrudable material and a bulk supply of filamentary material, guide means for leading the extrudable material from the bulk supply to the feed aperture, further guide means for leading the filamentary material from the said bulk supply between co-operating lead means on the die and the die head for guiding the filamentary material across the extruding orifice so that it is embedded in plastic material extruded therethrough and for guiding the composite extruded element so formed to a point on the die head radially spaced from the axis of the extruder, and additional guide means on the die head for leading the composite element from the said radially spaced point to a delivery point on the said axis.

References Cited in the file of this patent

UNITED STATES PATENTS

| | | |
|---|---|---|
| 1,763,136 | Crowley et al. | June 10, 1930 |
| 2,138,378 | Johnson | Nov. 29, 1938 |
| 2,147,281 | Coffin et al. | Feb. 14, 1939 |
| 2,331,139 | Safford | Oct. 5, 1943 |
| 2,547,151 | Braeseke | Apr. 3, 1951 |
| 2,661,497 | Birmingham | Dec. 8, 1953 |
| 2,674,007 | Allemann et al. | Apr. 6, 1954 |
| 2,791,803 | Henning | May 14, 1957 |
| 2,800,683 | Teichmann | July 30, 1957 |

FOREIGN PATENTS

| | | |
|---|---|---|
| 1,074,469 | France | Mar. 31, 1954 |
| 487,948 | Great Britain | June 29, 1938 |